Patented Mar. 20, 1923.

1,449,107

UNITED STATES PATENT OFFICE.

FRIEDRICH HAYDUCK, OF WILMERSDORF, GERMANY, ASSIGNOR TO THE FLEISCH-
MANN COMPANY, OF NEW YORK, N. Y., A CORPORATION OF OHIO.

LOW-ALCOHOL YEAST PROCESS.

No Drawing. Application filed October 30, 1920. Serial No. 420,834.

(GRANTED UNDER THE PROVISIONS OF THE ACT OF MARCH 3, 1921, 41 STAT. L., 1313.)

*To all whom it may concern:*

Be it known that I, FRIEDRICH HAYDUCK, a citizen of Germany, residing at Wilmersdorf, Germany, have invented certain new and useful Improvements in Low-Alcohol Yeast Processes (for which application for patent was filed in Germany March 31, 1915, Patent No. 303,221), of which the following is a specification.

This invention relates to a process for the manufacture of yeast, and more particularly to a so-called continuous process in which a nutrient solution is fed to a suspension of yeast, whereby yeast, such as compressed bakers' yeast, may be grown with the production of comparatively little alcohol.

An object of this invention is to provide an improved procedure for the commercial production of yeast in a convenient and economical manner.

In my co-pending applications, Serial Nos. 420,832 and 420,833, filed October 30, 1920, which correspond to the German Patents Nos. 300,662, and 303,222, processes are disclosed wherein the seed yeast is suspended either in water or in a dilute nutrient solution which is aerated and to which a yeast nutrient solution is substantially continuously added at a rate such that all of the yeast nutrients, and substantially all of the alcohol which may be formed, are assimilated by the yeast.

The worts which may be used in these processes may be of any type suitable for yeast propagation, as for example, the usual 12° Balling wort referred to in my first mentioned co-pending application No. 420,832, or the artificially prepared yeast nutrient solution comprising essentially sugar material and yeast nourishing inorganic salts, wherein the sugar is present to an amount of approximately 10%, and the yeast nutrient salts may be present up to an amount of one-half the sugar content, as described in my co-pending application Serial No. 420,833. As an example of the last mentioned nutrient solution, the following is given:

Sugar 100 parts, ammonium sulphate 40 parts, acid potassium phosphate 9 parts, magnesium sulphate 1 part, calcium carbonate for neutralization about 30 parts; or Molasses (containing 50% sugar) 100 parts, ammonium sulphate 10 parts, superphosphate (having 18% water soluble phosphoric acid) 10 parts, magnesium sulphate 0.5 parts, calcium carbonate for neutralization, about 4 parts.

In a certain aspect of this invention, therefore, the above described process of manufacture might likewise be considered to be terminated in any portion of the wort at this time so that without injury to the seeding of the wort, parts of the propagating liquid containing yeast might be constantly withdrawn. I have discovered that as a result of this, it is possible to carry on a process of uninterrupted operations, which may be called a continuous process.

As an example of the method of carrying out such a process, the following is given:

A high or deep, rather than broad, fermenting vat is selected in which there is arranged below the air supply piping an easily adjustable flowing-off device, which as is usual, leads to the separating centrifugal. The seed yeast is suspended in this vat in a liquid which should be non-toxic to yeast, for example, either in a small depth of water or of a diluted portion of the nutrient solution which is to be used. The suspension is then aerated and the addition of the remainder of the nutrient solution is begun in a substantially continuous manner and at a rate such that substantially all of the alcohol which may be formed is assimilated by the yeast. As soon as a sufficient amount of propagating solution and yeast has accumulated, for example, as soon as the fermenting vat is nearly filled up, the discharge valve is opened and is so adjusted that the liquid containing the yeast is discharged at substantially the same rate that the fresh nutrient solution is being admitted at the top of the vat. The liquid containing the yeast which is drawn off, is either led to the centrifugals or to other suitable yeast separating means, and the separated yeast is cooled, washed, and pressed in the usual manner.

It is known from the German patent to Rainier, No. 10135, that yeast may be grown in a dilute nutrient solution to which solutions of sugar and peptone are added separately, when required by the yeast, the ratio of peptones/sugar being maintained at 2/1, as is determined by suitable tests, the peptone being added either fractionally or continuously, and the sugar being added fractionally at certain intervals. In this process, the yeast is removed at successive intervals, either by skimming or by allowing it to settle and decanting the liquid, the liquid thus separated from the yeast being used as the seeded liquid for further propagation. The manner in which this is carried out necessitates the interruption of the propagation operation.

In contrast to the Rainier process, the present process effects the withdrawal of the yeast continuously and at substantially the same rate as that at which the nutrient supply is added, so that the volume of propagating liquid is maintained substantially constant and the yeast-containing solution is being constantly conducted to the centrifugals, thereby assuring a continuous output of yeast.

Although the worts described in my above mentioned co-pending applications are of gravities approximating 12° Balling, it will be seen that worts of other concentrations might be used, provided the rate of addition thereto be controlled so that the concentration of the propagating liquid would not rise above the point at which substantially all the alcohol which might be formed would be assimilated by the yeast.

Having described my invention, what I claim as new and desire to secure by Letters Patent, is:

1. A continuous process of propagating yeast which comprises suspending seed yeast in a relatively small depth of a non-toxic liquid in a relatively deep vat, aerating the liquid, adding during the period of propagation a yeast nutrient solution and, as soon as a sufficient quantity of propagating solution has accumulated, simultaneously withdrawing the yeast containing solution.

2. A continuous process of propagating yeast which comprises preparing a relatively concentrated yeast nutrient solution, withdrawing such a portion thereof into a relatively deep vat that when highly diluted it would fill a relatively small depth, diluting the portion, initiating propagation of yeast therein with aeration, substantially continuously adding the more concentrated nutrient solution during the period of propagation, and as soon as a sufficient quantity of propagating solution has accumulated, withdrawing the yeast containing solution from the vat at substantially the same rate that the fresh nutrient solution is added.

3. A continuous process of propagating yeast with a relatively low yield of alcohol which comprises preparing a relatively concentrated yeast nutrient solution, withdrawing such a portion thereof into a relatively deep vat that when highly diluted it would fill a relatively small depth, diluting the portion, initiating propagation of yeast therein with aeration, adding during the period of propagation the nutrient solution of higher concentration at a rate such that the concentration of the diluted portion does not rise above that at which substantially all alcohol which may be formed will be assimilated by the yeast, and as soon as a sufficient quantity of propagating solution has accumulated, withdrawing the yeast containing solution from the vat at substantially the same rate that the fresh nutrient solution is being added 4. A continuous process of propagating yeast with a relatively low yield of alcohol which comprises preparing a relatively concentrated yeast nutrient solution, withdrawing and highly diluting such a portion thereof that it would fill a relatively small depth in a relatively deep vat, initiating the propagation of yeast therein, substantially continuously adding during the period of propagation the nutrient solution of higher concentration at a rate such that the concentration of the diluted portion does not rise above that at which substantially all alcohol which may be formed will be assimilated by the yeast, and as soon as a sufficient quantity of propagating solution has accumulated, withdrawing the yeast containing solution from the vat at substantially the same rate that the fresh nutrient solution is being added.

In testimony whereof, I have affixed my signature.

FRIEDRICH HAYDUCK.